United States Patent [19]
Yamamura et al.

[11] Patent Number: 4,778,722
[45] Date of Patent: Oct. 18, 1988

[54] REINFORCING FIBERS AND COMPOSITE MATERIALS REINFORCED WITH SAID FIBERS

[75] Inventors: Takemi Yamamura; Toshihiro Ishikawa; Masaki Shibuya, all of Ube, Japan

[73] Assignee: Ube Industries, Ltd., Ube, Japan

[21] Appl. No.: 48,038

[22] Filed: May 11, 1987

[30] Foreign Application Priority Data

| May 15, 1986 | [JP] | Japan | 61-110471 |
| Jun. 3, 1986 | [JP] | Japan | 61-127312 |
| Oct. 24, 1986 | [JP] | Japan | 61-251799 |
| Nov. 7, 1986 | [JP] | Japan | 61-263652 |
| Nov. 14, 1986 | [JP] | Japan | 61-269563 |

[51] Int. Cl.$^4$ .................... B32B 9/00; D02G 3/00
[52] U.S. Cl. ................................ 428/367; 428/368; 428/372; 428/373; 428/375; 428/388; 428/392; 428/697; 428/698; 428/699; 501/35; 501/38; 501/95; 501/99
[58] Field of Search ............... 428/367, 368, 372, 373, 428/375, 388, 392, 697, 698, 699, 428; 501/38, 35, 95, 99

[56] References Cited

U.S. PATENT DOCUMENTS

| 4,342,712 | 8/1982 | Yajima et al. | 501/35 |
| 4,556,526 | 12/1985 | Yajima et al. | 501/91 |
| 4,610,917 | 9/1986 | Yamamura et al. | 428/367 |
| 4,618,529 | 10/1986 | Yamamura et al. | 428/367 |
| 4,622,270 | 11/1986 | Yamamura et al. | 428/608 |

Primary Examiner—Sharon A. Gibson
Attorney, Agent, or Firm—Ladas & Parry

[57] ABSTRACT

A reinforcing inorganic fiber composed of an internal layer and a surface layer, wherein
said internal layer is composed of an inorganic material containing silicon, either titanium or zirconium, carbon and oxygen which is
  (i) an amorphous material consisting substantially of Si, M, C and O, or
  (ii) an aggregate consisting substantially of ultrafine crystalline particles with a particle diameter of not more than 500 Å of $\beta$-SiC, MC, a solid solution of $\beta$-SiC and MC and $MC_{1-x}$, wherein M represents titanium or zirconium, and x is a number represented by $0 < x < 1$, or
  (iii) a mixture of the amorphous material (i) and the aggregate (ii), and
said surface layer is composed of an inorganic material consisting of silicon, either titanium or zirconium, and oxygen and optionally not more than 5% by weight of carbon which is
  (iv) an amorphous material consisting substantially of Si, M and O,
  (v) an aggregate composed of crystalline $SiO_2$ and $MO_2$, or
  (vi) a mixture of the amorphous material (iv) and the aggregate (v).

9 Claims, No Drawings

REINFORCING FIBERS AND COMPOSITE MATERIALS REINFORCED WITH SAID FIBERS

BACKGROUND OF THE INVENTION

1. Field of the Invention

This invention relates to inorganic fibers for use in reinforcing a composite material which are composed of an internal layer and a surface layer and can be colored in various colors, and a composite material which is reinforced with these inorganic fibers and assumes a beautiful color.

2. Description of the Prior Art

Carbon fibers and silicon carbide fibers have previously been used as reinforcing fibers for various composite materials (see Japanese Laid-Open Patent Publication No. 14687/1977). These fibers have poor wetting property with respect to the matrix and the bond strength between the matrix and the fibers is not sufficient. Hence, composite materials reinforced with these fibers do not have sufficient mechanical strength.

Furthermore, since these fibers are black, the composite materials reinforced with these fibers also assumes a black to grayish black color. It is impossible therefore to obtain a composite material of a beautiful appearance by using these fibers unless the surface of the composite material is coated or another resin is laminated to the composite material.

Metals or plastics reinforced with fibers find extensive use in a wide range of products requiring strength and light weight ranging from tennis rackets, fishing tackles, ski stocks, ski edges, racing cars and pipes to aircraft and automobiles. These applications require not only mechanical strength but also fashionability. Reinforcing fibers known heretofore cannot meet these two requirements at the same time.

Ceramics reinforced with fibers are used as various machine parts and structural materials. In these fields too, composites having a beautiful appearance are required. Known fiber-reinforced ceramics do no meet this requirement.

In composite materials obtained by using the known inorganic fibers, the reinforcing fibers tend to be localized during manufacture, and the fibers are distributed sparsely at some parts and densely at other parts. It is difficult therefore to control the volume ratio of the fibers in the composites. In particular, when the volume ratio of the fibers is low, the reinforcing fibers are not uniformly dispersed in the composite materials and the resulting composite materials do not have high mechanical properties.

A composite material reinforced only with inorganic fibers has high strength anisotropy and its strength is high in the lengthwise direction of the fibers, but low in a direction at right angles to it. A composite material reinforced with only short fibers is isotropic but generally has low strength.

It was proposed to use a combination of continuous long fibers and short fibers or whiskers as reinforcing fibers for composite materials. For example, the long fibers are used to reinforce the inside portion of the composite material and the short fibers, to reinforce its outside portion. To produce such a composite, the manufacturing process is complex, and the resulting composite material does not have sufficient strength. There is also a method in which long fibers and short fibers are mixed during prepreg production. According to this method, the short fibers can be applied to the surface of a bundle of long fibers by using a bristle or the like. It is difficult however to apply short fibers to the surface of every individual long fiber, and the quality of the fiber mass becomes nonuniform.

SUMMARY OF THE INVENTION

It is an object of this invention to provide reinforcing inorganic fibers for use in a composite material which can assume a beautiful color.

Another object of this invention is to provide reinforcing inorganic fibers which can assume a beauiful color and have high mechanical strength.

Another object of this invention is to provide reinforcing inorganic fibers which can assume a beautiful color and have high bond strength with respect to a matrix.

Another object of this invention is to provide a composite material composed of reinforcing inorganic fibers which can assume a beautiful color and a plastic matrix.

Another object of this invention is to provide a composite material composed of reinforcing inorganic fibers which can assume a beautiful color and a metallic matrix.

Another object of this invention is to provide a composite material composed of reinforcing inorganic fibers which can assume a beautiful color and a ceramic matrix.

Another object of this invention is to provide reinforcing inorganic fibers which can assume a beautiful color and can be uniformly distributed in a composite material.

Another object of this invention is to provide an inorganic fiber reinforced plastic, metallic or ceramic composite in which reinforcing inorganic fibers are uniformly dispersed.

According to this invention, there is provided a reinforcing inorganic fiber composed of an internal layer and a surface layer, wherein said internal layer is composed of an inorganic material containing silicon, either titanium or zirconium, carbon and oxygen which is (i) an amorphous material consisting substantially of Si, M, C and O, or (ii) an aggregate consisting substantially of ultrafine crystalline particles with a particle diameter of not more than 500 Å of $\beta$-SiC, MC, a solid solution of $\beta$-SiC and MC and $MC_{1-x}$, wherein M represents titanium or zirconium, and x is a number represented by $0 < x < 1$, or (iii) a mixture of the amorphous material (i) and the aggregate (ii), and said surface layer is composed of an inorganic material consisting of silicon, either titanium or zirconium, and oxygen and optionally not more than 5% by weight of carbon which is (iv) an amorphous material consisting substantially of Si, M and O, (v) an aggregate composed of crystalline $SiO_2$ and $MO_2$, or (vi) a mixture of the amorphous material (iv) and the aggregate (v).

According to this invention, there is also provided an inorganic fiber for use in composite materials comprising the aforesaid inorganic fiber and at least one heat-resistant material in the form of short fibers, whiskers or powder adhering thereto.

The present invention further provides an inorganic fiber-reinforced composite material comprising a matrix of a plastic, metallic or ceramic material and a reinforcing material which is at least one of the aforesaid inorganic fibers.

DETAILED DESCRIPTION OF THE INVENTION

The inorganic fiber in accordance with this invention can be produced, for example, by preparing an inorganic fiber having the composition of the internal layer mentioned above, and heating this fiber in an oxidizing atmosphere to form a surface layer.

The inorganic fiber having the same composition as the internal layer of the inorganic fiber of this invention can be produced by the method described, for example, in U.S. Pat. Nos. 4,342,712 and 4,515,747.

This method comprises a first step of mixing (1) a polycarbosilane having a number average molecular weight of about 500 to 10,000 and a main-chain skeleton composed mainly of structural units of the formula $-\!\!+\!\!Si\text{-}CH_2\!\!+\!\!-$ in which the silicon atom substantially has two side-chain groups selected from the class consisting of hydrogen atoms, lower alkyl groups and phenyl groups with (2) a polymetallosiloxane having a number average molecular weight of about 500 to 10,000 and a main-chain skeleton composed of metalloxane units of the formula $-\!\!+\!\!M\text{—}O\!\!+\!\!-$ wherein M represents Ti or Zr and siloxane units of formula $-\!\!+\!\!Si\text{—}O\!\!+\!\!-$, the ratio of the total number of the metalloxane units to that of the siloxane units being in the range of from 30:1 to 1:30, most of the silicon atoms of the siloxane units having 1 or 2 side-chain groups selected from the class consisting of lower alkyl and phenyl groups and most of the metal atoms of the metalloxane units having 1 or 2 lower alkoxy groups as side-chain groups, in such a mixing ratio that the ratio of the total number of the $-\!\!+\!\!Si\text{-}CH_2\!\!+\!\!-$ structural units of the polycarbosilane to the total number of the $-\!\!+\!\!M\text{—}O\!\!+\!\!-$ units is in the range of from 100:1 to 1:100, and heating the resulting mixture in an organic solvent in an atmosphere inert to the reaction to bond at least some of the silicon atoms of the polycarbosilane to at least some of the silicon atoms and/or metal atoms of the polymetallosiloxane through oxygen atoms and thereby form an organic metal polymer having a number average molecular weight of about 1000 to 50,000 and composed of a crosslinked polycarbosilane moiety and polymetallosiloxane moiety;

a second step of preparing a spinning dope of the resulting polymer and spinning it;

a third step of rendering the spun fiber infusible under tension or under no tension; and a fourth step of calcining the infusible fiber in vacuum or in an atmosphere of an inert gas at a temperature in the range of 800° to 1800° C.

Alternatively, the inorganic fiber consisting substantially of Si, Ti, C and O or of Si, Zr, C and O can be produced by a method which comprises:

a first step of mixing a polycarbosilane having a number average molecular weight of 200 to 10,000 and mainly containing a main-chain skeleton represented by the general formula

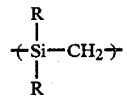

wherein R represents a hydrogen atom, a lower alkyl group or a phenyl group, and an organic metal compound represented by the general formula

MX₄ wherein M represents Ti or Zr and X represents an alkoxy group containing 1 to 20 carbon atoms, a phenoxy group, or an acetylacetoxy group, in such mixing ratios that the ratio of the total number of the structural units of the formula $-\!\!+\!\!Si\text{-}CH_2\!\!+\!\!-$ to the total number of the structural units of the formula $-\!\!+\!\!M\text{—}O\!\!+\!\!-$ of the organic metal compound is in the range of from 2:1 to 200:1, and reacting the mixture under heat in an atmosphere inert to the reaction to bond at least some of the silicon atoms of the polycarbosilane to the metal atoms of the organic metal compound through oxygen atoms and form an organic metallic polymer having a number average molecular weight of about 700 to 100,000;

a second step of preparing a spinning dope of the organic metal polymer and spinning it;

a third step of rendering the spun fiber insoluble under tension or under no tension; and a fourth step of calcining the infusible fiber at a temperature of 800° to 1800° C. in vacuum or in an atmosphere of an inert gas.

The inorganic fiber contains 30 to 60% by weight of Si, 0.5 to 35% by weight, preferably 1 to 10% by weight, of Ti or Zr, 25 to 40% by weight of C, and 0.01 to 30% by weight of O.

The surface layer is formed by heating the resulting inorganic fibers in an oxidizing atmosphere at a temperature in the range of usually 500° to 1,600° C., and the inorganic fibers of this invention for use in composite materials can be obtained. The oxidizing atmosphere may, for example, be air, pure oxygen, ozone, steam, or carbon dioxide gas.

This heat-treatment imparts various colors to the inorganic fibers. The color hues of the inorganic fiber can be changed as desired by varying the heating conditions in the oxidizing atmosphere and thus adjusting the thickness of the surface layer. For example, the color becomes violet under mild oxidation conditions. As the oxidation conditions become severer, the color changes to blue, green, orange, brown or red. Those skilled in the art can easily adjust the color hue according to the above teaching.

The proportions of the individual elements in the internal layer of the resulting inorganic fiber remains substantially the same as those in the above inorganic fiber. The surface layer contains 20 to 65% by wight of Si, 30 to 55% by weight of O, 0.3 to 40% by weight, preferably 1 to 15% by weight, of Ti or Zr, and 1 to 5% by weight of carbon.

The internal layer of the inorganic fiber has a diameter of usually 3 to 20 micrometers, preferably 5 to 15 micrometers, and the thickness of the surface layer is usually 0.01 to 5 micrometers.

The present invention further provides an inorganic fiber for use in composite materials composed of the above inorganic fibers at least one heat-resistant material in the form of short fibers, whiskers or powder adhering to the inorganic fiber.

The proportion of the heat-resistant material is 0.5 to 500% by volume, preferably 1 to 80% by volume, more preferably 2 to 30% by volume, based on the inorganic fiber.

The heat-resistant material includes, for example, ceramics, metals and intermetallic compounds.

Examples of the ceramics are silicon carbide, titanium carbide, zirconium carbide, niobium carbide, tantalum carbide, boron carbide, chromium carbide, tungsten carbide, molybdenum carbide, silicon nitride, titanium nitride, zirconium nitride, vanadium nitride, niobium nitride, tantalum nitride, boron nitride, aluminum nitride, hafnium nitride, alumina, silica, magnesia, mullite, cordierite, borosilicate glass and lithium silicate.

The metals are, for example, molybdenum, ttungsten, copper, nickel, stainless steel and titanium.

Examples of the intermetallic compounds include $CuZn$, $FeAl$, $Ag_2Al$, $Cu_5Sn$, $Cu_5Zn_8$, $Cu_9Al_4$, $Cu_{31}Sn_8$, $CuZn_3$, $Cu_3Sn$, $Ag_5Al_3$, $FeZn_7$, $AsSb$, $GaAs$, $CaSb$, $InP$, $InAs$, $InSb$.

Whiskers suitably used in this invention have an average diameter of 0.1 to 2 micrometers and an average fiber length of 10 to 100 micrometers. The powdery heat-resistant material has an average particle diameter of not more than 2 micrometers, preferably not more than 1 micrometer, more preferably not more than 0.5 micrometer. The short fibers have an average diameter of 1 to 30 micrometers, preferably 5 to 25 micrometers and an average length not more than 5 mm, preferably not more than 1 mm.

There is no particular restriction on the method of producing the inorganic fiber having the heat-resistant material adhering thereto. For example, there can be employed an electrodeposition method, a method using a fluidized bed, a blowing method, and a suspension dipping method. The suspension dipping method is conveniently used from the standpoint of simplicity and the broad range of applicability.

On example of the suspension dipping method comprises dipping a continuous inorganic fiber wound up on a bobbin or the like, a continuous inorganic fiber bundle composed of a suitable number of continuous inorganic fibers, or a woven fabric of continuous inorganic fibers in a liquid having at least one of the short fibers, whiskers and powder suspended therein, thereby to adhere the short fibers, whiskers or powder onto the surface of the continuous inorganic fiber or the fibers of the woven fabric.

When the continuous inorganic fiber bundles containing many fibers or the woven fabric is to be dipped, it is preferred to vibrate the liquid by ultrasonication and adhere the short fibers, whiskers or powder uniformly to the individual fibers. The frequency of vibrations of the ultrasonication is conveniently about 10 to 2,000 KHz.

The liquid may be water, but an organic solvent such as ethanol, methanol or acetone is preferably used.

As required, the continuous inorganic fibers may be sized. All known sizing agents for inorganic fibers may be used for this purpose. Examples include polyethylene oxide, polystyrene oxide, polymethylene, polyvinyl alcohol and epoxy resins. The preferred proportion of the sizing agent is 0.5 to 50% by volume based on the total amount of the continuous inorganic fibers and the short fibers, whiskers or powder of the heat-resistant material. The sizing treatment of the continuous inorganic fiber may be carried out before or during the adhesion of the heat-resistant material in the form of short fibers, whiskers or powder.

The concentration of the heat-resistant materials in the suspension is not particularly limited. Preferably, it is 0.5 to 30 g/liter since too low a concentration cannot achieve uniform adhesion of the heat-resistant material to the continuous fiber, and too high a concentration results in an excessively large amount of the material adhering to the fiber.

In the plastic, metallic or ceramic composite materials reinforced with the inorganic fibers of this invention, the inorganic fibers may be used in various forms, for example in the form of a blend of such fibers arranged monoaxially or multiaxially, a woven fabric such as a fabric of the plain, satin, imitation gauze, twill or leno weave or a helically or three-dimensionally woven fabric, or chopped strands.

Suitable plastics for use as a matrix in the inorganic fiber-reinforced plastic composite material in accordance with this invention include epoxy resins, modified epoxy resins, polyester resins, polyimide resins, phenolic resins, polyurethane resins, polyamide resins, polycarbonate resins, silicone resins, phenoxy resins, polyphenylene sulfide, fluorine resins, hydrocarbon resins, halogen-containing resins, acrylic resins, ABS resins, ultrahigh-molecular-weight polyethylene, modified polyphenylene oxide, and polystyrene. Use of transparent plastics is preferred in order to take advantage of the beautiful color of the inorganic fibers.

The plastic composite material of this invention may be produced by ordinary methods of producing fiber-reinforced plastic composite materials, such as (1) the hand layup method, (2) the matched metal die method, (3) the break away method, (4) the filament winding method, (5) the hot press method, (6) the autoclave method, and (7) the continuous pulling method.

(1) According to the hand lay up method, the composite material can be produced by cutting the inorganic fibers, laying them up on a mold, coating the plastic containing a catalyst on the laid inorganic fibers by means of a brush or roller, allowing it to cure spontaneously, and then removing the mold.

(2) According to the matched metal die method, the composite material can be produced by impregnating the inorganic fibers with a mixture of the plastic, a curing agent, a filler and a thickening agent, and molding the impregnated fibers under heat and pressure. Depending upon the form of the material during molding, either a sheet molding compound method or a bulk molding compound method can be selected.

(3) According to the break away method, the composite material can be produced by impregnating a sheet of the inorganic fibers with the plastics, precuring the impregnated sheet to form a prepreg, winding the prepreg about a tapered mandrel, curing the prepreg and pulling out the cured sheet from the spindle. A hollow article having a complex configuration is produced by this method.

(4) According to the filament winding method, the composite material can be produced by impregnating the inorganic fibers with a thermosetting resin such as an epoxy resin or an unsaturated polyester resin, winding the impregnated inorganic fibers about a mandrel, curing the resin, and then removing the mold. As required, either a wet method or a dry method (using a prepreg tape) can be selected.

(5) According to the hot press method, a composite material in the form of a plate can be produced by stacking prepreg sheets in one direction or at any desired angle, and compressing the stacked assembly under heat and pressure.

(6) According to the autoclave method, the composite material can be produced by stacking prepregs in a mold, enveloping them with a special rubber, placing the enveloped material in a high-pressure kettle under vacuum, and heating it under pressure to effect curing. This method is suitable for forming articles of a complex shape.

(7) According to the continuous pulling method, a long strip of composite material can be produced by separately feeding the inorganic fibers and the plastics into a molding machine, mixing them just in front of the mold, and passing the molded mixture through a heating furnace.

The preferred plastic composite material of this invention has a short beam shear strength of at least 9 kg/mm$^2$, a tensile strength, in a direction perpendicular to the fiber, (transverse tensile strengths) of at least 10 kg/mm$^2$, a flexural strength, in a direction perpendicular to the fiber, of at least 11 kg/mm$^2$, and a flexural impact value.

Metals suitable for use as a matrix in the inorganic fiber-reinforced metallic composite material of the invention include aluminum, aluminum alloys, magnesium, magnesium alloys, titanium and titanium alloys.

The metallic composite material of this invention may be produced by ordinary methods for producing fiber-reinforced metallic composites, for example by (1) a diffusion bonding method, (2) a melting-penetration method, (3) a flame spraying method, (4) an electrodeposition method, (5) an extrusion and hot roll method, (6) a chemical vapor deposition method, and (7) a sintering method. These methods will be more specifically described below.

(1) According to the diffusion bonding method, the composite material can be produced by arranging the inorganic fibers and metal wires as the matrix alternately in one direction, covering both surfaces of the resulting assembly with thin films of the matrix metal or covering its under surface with a thin film of the matrix metal and its upper surface with a powder of the matrix metal mixed with an organic binder to form a composite layer, stacking several such layers, and thereafter consolidating the stacked layers under heat and pressure. The organic binder is desirably one which volatilizes before it is heated to a temperature at which it forms a carbide with the matrix metal. For example, CMC, paraffin, resins, and mineral oils are preferably used. Alternatively, the composite material may be produced by applying a powder of the matrix metal mixed with the organic binder to the surface of a mass of the inorganic fibers, stacking a plurality of such assemblies, and consolidating the stacked assemblies under heat and pressure.

(2) According to the melting-penetration method, the composite material may be produced by filling the interstices of arranged inorganic fibers with a molten mass of aluminum, an aluminum alloy, magnssium, a magnesium alloy, titanium or a titanium alloy. Since wetting between the fibers and the matrix metal is good, the interstices of the arranged fibers can be uniformly filled with the matrix metal.

(3) According to the flame spray method, the composite material can be produced in tape form by coating the matrix metal on the surface of arranged inorganic fibers by plasma spraying or gas spraying. It may be used as such, or if desired, a plurality of such tape-like composite materials are stacked and processed by the diffusion bonding method described in (1) above to produce a composite material.

(4) According to the electrodeposition method, the matrix metal is electrolytically deposited on the surface of the fibers to form a composite. A plurality of such composites are stacked and processed by the diffusion bonding method (1) to produce a composite material.

(5) According to the extrusion and hot roll method, the composite material can be produced by arranging the inorganic fibers in one direction, sandwiching the arranged fibers with foils of the matrix metal, and passing the sandwiched structure through optionally heated rolls to bond the fibers to the matrix metal.

(6) According to the chemical vapor deposition method, the composite material may be produced by introducing the inorganic fibers into a heating furnace, thermally decomposing them by introducing a gaseous mixture of, for example, aluminum chloride and hydrogen gas to deposit the aluminum metal on the surface of the fibers, stacking a plurality of such metal-deposited inorganic fiber masses, and processing them by the diffusion bonding method (1).

(7) According to the sintering method, the composite material can be produced by filling the interstices of arranged inorganic fibers with a powder of the matrix metal, and then sintering them under heat with or without pressure.

The preferred metallic composite material of this invention has a short beam shear strength of at least about 6 kg/mm$^2$, a transverse tensile strength of at least about 4 kg/mm$^2$, and a fatigue limit/tensile strength ratio of at least about 0.35. The inorganic fibers in the composite material during its formation have excellent mechanical properties represented by an initial reaction degradation speed of not more than about 0.3 kg/mm$^2$.sec$^{-1}$, and a tenacity reduction ratio of not more than about 35%.

In order to impart a beautiful color to the composite material, it is desirable for the inorganic fibers, at least partly, to exist to a depth of at most about 10 micrometers, preferably at most about 5 micrometers, from its surface, or to be exposed on its surface.

The preferred mechanical properties vary with the type of the metal forming the matrix.

Examples of ceramics suitable as the matrix in the inorganic fiber-reinforced ceramic composite material of the invention include carbide ceramics such as silicon carbide, titanium carbide, zirconium carbide, niobium carbide, tantalum carbide, boron carbide, chromium carbide, tungsten carbide and molybdenum carbide; nitride ceramics such as silicon nitride, titanium nitride, zirconium nitride, vanadium nitride, niobium nitride, tantalum nitride, boron nitride, aluminum nitride, and hafnium nitride; oxide ceramics such as alumina, silica, magnesia, mullite and cordierite; and glasses such as borosilicate glass and lithium silicate glass. In view of the color of the resulting composite material, the use of the ceramic oxides and glasses is preferred.

The inorganic fiber-reinforced ceramic composite material can be produced by methods known per se.

An aggregate of a powdery ceramic matrix and the inorganic fibers is prepared, for example by a method comprising embedding the inorganic fibers in the powdery ceramic matrix or a mixture of it with a known ceramic binder, a method comprising arranging the powder ceramic matrix and the inorganic fibers or the above mixture alternately, or a method comprising arranging the inorganic fibers and filling the powdery ceramic matrix or the mixture in the interstices of the fibers. The resulting aggregate is compressed by a rubber press, a mold press, etc., and then sintering the aggregate, or hot-pressed, for example, to produce the inorganic fiber reinforced ceramic composite material. As required, a ceramic composite material having a higher density can be obtained by dipping the resulting ceramic composite material in a molten liquid of an organosilicon compound or an organosilicon polymer or an organic solvent solution of the above compound or polymer under reduced pressure to impregnate the molten liquid or the solution to in the grain boundaries and pores of the sintered body, and thereafter heating the impregnated sintered body. This treatment is carried out in an inertgaseous atmosphere at a temperature of usually 800° to 2,500° C. The treatment may be carried out twice or more times.

The preferred ceramic composite material of this invention has excellent strength as represented by a flexural strength at room temperature of at least 15 kg/mm² and a heat cycle number, determined by a spalling test, of at least 5.

The tensile strength ($\sigma_c$) of the composite material produced from the inorganic fibers and the matrix is represented by the following formula.

$$\sigma_c = \sigma_f V_f + \sigma_M V_M$$

wherein $\sigma_c$: the tensile strength of the composite material,
$\sigma_f$: the tensile strength of the inorganic fibers,
$\sigma_M$: the tensile strength of the matrix metal,
$V_f$: the percent by volume of the inorganic fibers,
$V_M$: the percent by volume of the matrix metal.

As shown by the above formula, the strength of the composite material becomes larger as the volumetric proportion of the inorganic fibers in the composite material becomes larger. To produce a composite material having high strength, the volumetric proportion of the inorganic fibers should be increased. If, however, the volumetric proportion of the inorganic fibers exceeds 70%, the amount of the matrix becomes smaller and it is impossible to fill the interstices of the inorganic fibers fully with the matrix. The resulting composite material fails to exhibit the strength represented by the above formula. If, on the other hand, the amount of the fibers is decreased, the strength of the composite material represented by the above formula is reduced. To obtain composite materials of practical use, it is necessary to incorporate at least 10% of the inorganic fibers. Accordingly, the best results can be obtained in the production of the inorganic fiber-reinforced composite material of this invention when the volumetric proportion of the inorganic fibers to be incorporated is adjusted to 10 to 70% by volume, preferably 30 to 60% by volume.

The present invention provides a beautiful inorganic fibers assuming various colors such as red, violet, blue and green by using a simple method involving heat-treatment in an oxidizing atmosphere. Since the inorganic fibers of the invention have a beautiful color, a composite material consisting of these fibers and a plastic, metallic or ceramic matrix assuming a beautiful color can be obtained.

Since the inorganic fibers of this invention permit excellent wetting with plastics, metals and ceramics, it is not particularly necessary to treat the surfaces of these fibers. Furthermore, since the inorganic fibers have excellent strength of bonding to the matrix, the composite materials of this invention containing the inorganic fibers as a reinforcement show good mechanical properties.

The present invention also provides inorganic fiber-reinforced composite materials in which the inorganic fibers are uniformly dispersed.

The various mechanical properties, as used herein, are measured by the following methods.

(a) Initial degradation speed (for the inorganic fiber-refinforced metallic composite material)

(1) When a metal or its alloy having a melting point of not more than 1200° C. is used:

The inorganic fibers are immersed for 1, 5, 10, and 30 minutes respectively in a molten metal heated to a temperature 50° C. higher than its melting point The fibers are then withdrawn and their tensile strength is measured. The relation between the immersion time and the tensile strength of the fibers (degradation curve) was determined, and the initial degradation speed (kg/mm².sec$^{-1}$) is determined from the tangential line at an immersion time of 0.

(2) When a metal or its alloy having a melting point higher than 1200° C. is used:

The inorganic fibers and a foil of the metal are stacked, and the assembly is heated in vacuum to a temperature corresponding to the melting point of the metal foil multiplied by (0.6–0.7), and maintained under a pressure of 5 kg/mm² for a period of 5, 10, 20 and 30 minutes respectively. The fibers are then separated, and their tesile strength is measured. From the result of the measurement the initial degradation speed is determined by the same procedure as in (1) above.

The initial reaction degradation speed shows the degree of the reaction of the fibers with the matrix metal when a fiber reinforced metal is to be produced within a short period of time. The smaller this value, the better the compatibility between the fibers and the matrix and the greater the effect of reinforcing by the fibers.

(b) Fiber tenacity reduction ratio (for the inorganic fiber-reinforced metallic composite material)

The tenacity of the fibers is measured at an immersion time of 30 minutes and a maintenance time of 30 minutes in (a) above, and subtracted from the tenacity of the fibers before immersion or maintenance (initial tenacity). The balance is divided by the initial tenacity, and defined as the fiber tenacity reduction ratio.

The tenacity reduction ratio shows the degree of the reaction between the fibers and the matrix when a fiber reinforced metal is to be produced over a long period of time. The smaller this value, the better the compatibility between the fibers and the matrix and the greater the effect of reinforcing by the fibers.

(c) Short beam shear test

This test is designed to measure shear stress between layers. A sample of the composite material (10×12×2 mm) in which the inorganic fibers are monoaxially oriented is placed on two pins having a radius of curvature of 6 mm and a length of 20 mm and compressed by a pressing member having a tip radius of curvature of 3.5 mm. The test is carried out by the so-called 3-point bending method, and the shear stress between the layers is measured and expressed in kg/mm².

(d) Transverse tensile strength

A monoaxially fiber-reinforced composite material having a thickness of 2 mm is produced, and a test sample is prepared from it so that the axial direction of the test sample crosses the fiber arranging direction at right angles. The thickness of the test sample is 2 mm. A curvature of 125 mmR is provided centrally in the thickness direction in the sample and the central portion is finished to a thickness of about 1 mm. The tensile speed is 1 mm/min. The result is expressed as tensile strength in kg/mm².

The short beam shear strength and transverse tensile strength are indices which represent the strength of bonding between the matrix and the fibers.

(e) Fatigue test

A rotating bending fatigue test with a capacity of 1.5 kgm is carried out. The fatigue strength in the $10^7$th cycle is measured and defined as the fatigue limit. The fatigue limit is an index for safety design of the mechanical structure of the composite material in use.

The following examples illustrate the present invention more specifically.

PRODUCTION EXAMPLE 1

Production of inorganic fibers (I)

Three parts by weight of polyborosiloxane was added to 100 parts by weight of polydimethylsilane synthesized by dechlorinating condensation of dimethyldichlorosilane with metallic sodium. The mixture was subjected to thermal condensation at 350° C. in nitrogen to obtain polycarbosilane having a main-chain skeleton composed mainly of carbosilane units of the formula $+Si-CH_2+$ and containing a hydrogen atom and a methyl group attached to the silicon atom of the carbosilane units. A titanium alkoxide was added to the resulting polycarbosilane, and the mixture was subjected to crosslinking polymerization at 340° C. in nitrogen to obtain polytitanocarbosilane composed of 100 parts of the carbosilane units and 10 parts of titanoxane units of the formula $+Ti-O+$. The polymer was melt-spun, and treated in air at 190° C. to render the fibers infusible. Subsequently, the fibers were calcined in nitrogen at 1300° C. to obtain inorganic fibers (I) consisting mainly of silicon, titanium (3% by weight), carbon and oxygen and having a diameter of 13 microns, a tensile strength of 310 kg/mm² and a moduus of elasticity of 16 tons/mm². The resulting inorganic fibers are composed of a mixture of an amorphous material consisting of Si, Ti, C and O and an aggregate of ultrafine crystalline particles with a particle diameter of about 50 Å of β-SiC, TiC, a solid solution of β-SiC and TiC and $TiC_{1-x}$ ($0<x<1$) and amorphous $SiO_2$ and $TiO_2$ The inorganic fibers contain 45% by weight of Si, 3.0% by weight of Ti, 25.4% by weight of C and 24.7% by weight of O.

PRODUCTION EXAMPLE 2

Production of inorganic fibers (II)

Tetrakis-acetylacetonato zirconium was added to the polycarbosilane obtained as described above, and the mixture was subjected to crosslinking polymerization at 350° C. in nitrogen to obtain polyzirconocarbosilane composed of 100 parts of carbosilane units and 30 parts of zirconoxane units of the formula $+Zr-O+$. The polymer was dissolved in benzene and dry-spun, and treated in air at 170° C. to render the fibers infusible. Subsequently, the fibers were calcined at 1200° C. in nitrogen to obtain amorphous inorganic fibers (II) consisting mainly of silicon, zirconium, carbon and oxygen with 4.5% by weight of zirconium element and having a diameter of 10 microns, a tensile strength of 350 kg/mm², and a modulus of elasticity of 18 tons/mm².

EXAMPLE 1

By heat-treating the inorganic fibers [I] in air at 900° C. for 1 hour, inorganic fibers emitting reflecting light of brilliant blue were obtained. The fibers had a diameter of 13.2 micrometers, a tensile strength of 300 kg/mm² and a tensile modulus of 15.3 tons/mm² and had an amorphous glass layer (0.2 micrometer) on the fiber surface.

Without surface treatment, the fibers were aligned monoaxially in sheet form, and impregnated with a commercial bisphenol A-type epoxy resin. The epoxy resin was pre-cured to form prepreg sheets having a thickness of 0.15 mm. The prepreg sheets were stacked, and hot pressed at 170° C. under 7 kg/cm² for 4 hours to produce an inorganic fiber-reinforced epoxy resin composite materaal having a thickness of 2 mm. The composite material contained 60% by volume of the inorganic fibers. The composite material showed a mild blue color by the harmony of blue reflected light emitted from the surface of the inorganic fiber and reflecting light from the epoxy resin layer.

The composite material had the following mechanical properties

Tensile strength (kg/mm²): 184
Tensile modulus (t/mm²): 15.6
Flexural strength (kg/mm²): 223
Flexural modulus (t/mm²) 14.3
Tensile strength in a directionperpendicular to the fibers (kg/mm²): 10.1
Tensile modulus in a direction perpendicular to the fibers (t/mm²): 2.2
Flexural strength in a direction perpendicular to the fibers (kg/mm²): 11.8
Flexural modulus in a direction perpendicular to the fibers (t/mm²): 2.1
Short beam shear strength (kg/mm²): 12.3
Flexural impact value (kg-cm/cm²): 276

COMPARATIVE EXAMPLE 1

Example 1 was repeated except that the inorganic fibers [I] were used directly instead of the inorganic fibers [I] heated in air.

The resulting composite material showed the following excellent mechanical properties, but its color was a charcoal color reflecting the black color of the inorganic fibers [I].

The composite material had the following mechanical properties.

Tensile strength (kg/mm²): 190
Tensile modulus (t/mm²): 16
Flexural strength (kg/mm²): 221
Flexural modulus (t/mm²): 15
Tensile strength in a direction perpendicular to the fibers (kg/mm²): 10.3
Tensile modulus in a direction perpendicular to the fibers (t/mm²) 2.3
Flexural strength in a direction perpendicular to the fibers (kg/mm²): 12.4

Flexural modulus in a direction perpendicular to the fibers (t/mm$^2$): 2.2
Short beam shear strength (kg/mm$^2$): 12.5
Flexural impact value (kg-cm/cm$^2$): 280.

EXAMPLE 2

The inorganic fibers [I] were heat-treated in air at 100° C. for 30 minutes to form inorganic fibers emitting reflected light of pale green. The fibers had a diameter of 13.3 micrometers, a tensile strength of 298 kg/mm$^2$ and a tensile modulus of 15.1 t/mm$^2$ and had an amorphous glass layer (0.4 micrometer) on the surface of the fibers.

A composite material was produced in the same way as in Example 1 using the resulting inorganic fibers. The resulting composite material assumed pale green reflecting the color of light reflected from the surface of the fibers, and had the following excellent mechanical properties.
Tensile strength (kg/mm$^2$): 187
Tensile modulus (t/mm$^2$): 15.1
Flexural strength (kg/mm$^2$): 220
Flexural modulus (t/mm$^2$): 14.1
Tensile strength in a direction perpendicular to the fibers (kg/mm$^2$): 10.8
Tensile modulus in a direction perpendicular to the fibers (t/mm$^2$): 2.1
Flexural strength in a direction perpendicular to the fibers (kg/mm$^2$): 11.4
Flexural modulus in a direction perpendicular to the fibers (t/mm$^2$): 2.1
Short beam shear strength (kg/mm$^2$): 12.0
Flexural impact value (kg-cm/cm$^2$): 273.

EXAMPLE 3

The inorganic fibers [II] were heat-treated for hour in air at 800° C. to obtain inorganic fibers emitting reflecting light of bluish violet. The fibers had a diameter of 10.2 micrometers, a tensile strength of kg/mm$^2$ and a tensile modulus of 17.2 kg/mm$^2$ and contained an amorphous glass layer (about 0.3 micrometer) on the fiber surface.

The fibers were aligned monoaxially in sheet form, and impregnated with the same epoxy resin as used in Example 1. The resin as pre-cured to form prepreg sheets. The sheets were stacked, and heated under pressure in an autoclave to form an inorganic fiber-reinforced epoxy composite material.

The composite material contained 58% by volume of the fibers, and assumed blue violet color reflecting the reflecting light from the surface of the fibers themselves. It had the following mechanical properties.
Tensile strength (kg/mm$^2$): 198
Tensile modulus (t/mm$^2$): 17.2
Flexural strength (kg/mm$^2$): 23.4
Flexural modulus (t/mm$^2$): 16.6
Tensile strength in a direction perpendicular to the fibers (kg/mm$^2$): 10.1
Tensile modulus in a direction perpendicular to the fibers (t/mm$^2$): 2.4
Flexural strength in a direction perpendicular to the fibers (kg/mm$^2$): 12.5
Flexural modulus in a direction perpendicular to the fibers (t/mm$^2$): 2.1
Short beam shear strength (kg/mm$^2$): 13.0
Flexural impact value (kg-cm/cm$^2$): 279

COMPARATIVE EXAMPLE 2

Example 3 was repeated except that the inorganic fibers [II] were used directly instead of the inorganic fibers [II] heated in air.

The resulting composite material showed the following excellent mechanical properties, but its color was a charcoal color reflecting the black color of the inorganic fibers [I].

The composite material had the following mechanical properties.
Tensile strength (kg/mm$^2$): 206
Tensile modulus (t/mm$^2$): 18
Flexural strength (kg/mm$^2$): 239
Flexural modulus (t/mm$^2$): 16.8
Tensile strength in a direction perpendicular to the fibers (kg/mm$^2$): 10.8
Tensile modulus in a direction perpendicular to the fibers (t/mm$^2$): 2.5
Flexural strength in a direction perpendicular to the fibers (kg/mm$^2$): 12.7
Flexural modulus in a direction perpendicular to the fibers (t/mm$^2$): 2.3
Short beam shear strength (kg/mm$^2$): 13.2
Flexural impact value (kg-cm/cm$^2$): 290

REFERENTIAL EXAMPLE

Silicon carbide fibers obtained only of polycarbosilane used for comparison was produced by the following method.

Polyborosiloxane (3 parts by weight) was added to 100 parts of polydimethylsilane synthesized by dehydro-chlorinating condensation of dimethyldichlorosilane with metallic sodium and the mixture was subjected to thermal condensation at 350° C. in nitrogen to obtain polycarbosilane having a main-chain skeleton composed mainly of carbosilane units of the formula $-(-Si-CH_2-)-$ in which the silicon atoms of the carbosilane units had a hydrogen atom and a methyl group. The resulting polymer was melt-spun, rendered infusible at 190° C. in air, and subsequently calcined at 1,300° C. in nitrogen to give silicon carbide fibers composed mainly of silicon, carbon and oxygen and having a diameter of 13 micrometers, a tensile strength of 300 kg/cm$^2$ and a tensile modulus of 16 t/mm$^2$.

EXAMPLE 4

The heat-treated inorganic fibers obtained in Example 1 were aligned monoaxially on a pure aluminum foil (1070) having a thickness of 0.5 mm, and covered with an aluminum foil. The assembly was formed into a composite foil by hot rolls kept at a temperature of 670°. Twenty-seven such composite foils were produced, left to stand in vacuum at 670° C. for 10 minutes, and then hot-pressed at 600° C. to produce an inorganic fiber-reinforced aluminum composite material. The composite material contained 30% by volume of the inorganic fibers, and showed a mild blue color hue by the harmony of the natural metallic luster of the aluminum matrix and blue reflected light emitted from the surface of the inorganic fibers. The composite material had a tensile strength of 63 kg/mm$^2$ and a modulus of elasticity of 8,000 kg/mm$^2$.

COMPARATIVE EXAMPLE 3

Example 4 was repeated except that the silicon carbide fibers obtained in Referential Example were used instead of the heat-treated inorganic fibers [I] used in Example 4.

The resulting silicon carbide fiber-reinforced aluminum composite contained 30% by volume of the fibers, and showed a charcoal color reflecting the color of the silicon carbide fibers. It had a tensile strength of 37 kg/mm² and a modulus of elasticity of 6,300 kg/mm² which were much inferior to those of the composite material obtained in Example 4.

COMPARATIVE EXAMPLE 4

Example 4 was repeated except that high-tenacity polyacrylonitrile-type carbon fibers were used instead of the heat-treated inorganic fibers [I] used in Example 4. The resulting carbon fiber-reinforced aluminum composite material contained 30% by volume of the fibers showed a charcoal color reflecting the black color of the carbon fibers. It had a tensile strength of 25 kg/mm² which was much inferior to that of the composite material obtained in Example 4.

EXAMPLE 5

The inorganic fibers [I] were heat-treated in air at 800° C. for 1 hour to give inorganic fibers emitting reflecting light of brilliant red. The fibers had a diameter of 13.0 micrometers, a tensile strength of 305 kg/mm² and a tensile modulus of 15.8 t/mm², and contained an amorphous glass layer (0.2 micrometer) on their surface.

A composite material was produced in the same way as in Example 4 except that the resulting inorganic fibers were used instead of the inorganic fibers used in Example 4. The resulting composite material showed a mild red color. It had a tensile strength of 65 kg/mm² and a modulus of elasticity of 8,200 kg/mm².

EXAMPLE 6

Example 4 was repeated except that the heat-treated inorganic fibers used in Example 3 were used instead of the inorganic fibers used in Example 4. The resulting composite material showed a mild bluish violet color and had a tensile strength of 74 kg/mm² and a modulus of elasticity of 9,000 kg/mm².

The initial degradation speeds, fiber tenacity reduction ratios, short beam shear strengths (SBSS), transverse tensile strengths (TTS) and fatigue limit/tensile strength ratios of the aluminum composite materials obtained in Example 4 and Comparative Example 3 are shown in Table 1.

TABLE 1

| Properties | Inorganic fibers (I) (invention) | SiC fibers (comparison) | Carbon fibers (comparison) |
|---|---|---|---|
| Initial degradation speed (kg/mm² · sec⁻¹) | 0.08 | 1.2 | 3.2 |
| Fiber tenacity reduction ratio (%) | 18 | 70 | 90 |
| SBSS (kg/mm²) | 6 | 4.4 | 2.2 |
| TTS (kg/mm²) | 4.5 | 3.5 | 1.8 |
| Fatigue limit/tensile strength | 0.4 | 0.3 | 0.25 |

TABLE 1-continued

| Properties | Inorganic fibers (I) (invention) | SiC fibers (comparison) | Carbon fibers (comparison) |
|---|---|---|---|

EXAMPLE 7

Chopped fibers (45%) obtained by cutting the heat-treated inorganic fibers obtained in Example 1 to a length of 10 mm were added to a borosilicate glass (7740) having an average particle diameter of 44 micrometers (produced by Corning Glass Co.). The mixture was well dispersed in isopropanol. The resulting slurry and the inorganic fibers obtained in Example 1 uniformly aligned in one direction were alternately stacked, and the resulting stacked assembly was dried and treated by a hot press in an argon atmosphere at 1,300° C. under 750 kg/cm² for about 10 minutes to obtain an inorganic fiber-reinforced ceramic composite material.

The resulting composite material had a flexural strength at room temperature of 18.5 kg/mm². The surface of the composite material showed a beautiful blue color reflecting the reflected light of the fibers.

EXAMPLE 8

Example 7 was repeated except that the heat-treated fibers obtained in Example 2 were used instead of the chopped fibers used in Example 7.

The resulting inorganic fiber reinforced composite material had a flexural strength at room temperature of 18.1 kg/mm². The surface of the composite material showed a beautiful green color reflecting the reflected light of the fibers.

EXAMPLE 9

Example 7 was repeated except that the heat-treated inorganic fibers used in Example 3 were instead of the chopped fibers used in Example 7.

The resulting composite material had a flexural strength at room temperature of 20.5 kg/mm². The surface of the composite material showed a beautiful bluish violet reflecting the reflected light of the fibers.

EXAMPLE 10

Titanium oxide (2% by weight) was mixed with alumina having an average particle diameter of 0.5 micrometer, and 15% by weight of chopped fibers obtained by cutting the heat-treated inorganic fibers obtained in Example 1 to a length of 5 mm were added. These materials were thoroughly stirred in an alumina ball mill. The mixture was sintered at 2,000° C. in a hot press.

For comparison, a sintered body was prepared in the same way as above except that the chopped fibers were not added.

The two sintered bodies were subjected to a spalling test using flat plate samples. The flat plates were each placed in a furnace kept at 1,500° C. and rapidly heated for 20 minutes. Then, they were taken out of the furnace and forcibly air cooled for 20 minutes. This cycle was repeated and the occurrence of cracks was examined.

The inorganic fiber-reinforced alumina sintered body of the invention withstood seven heat cycles until cracks formed. But the non-reinforced alumina sintered body developed cracks after two heat cycles.

The sintered body of the invention showed a beautiful blue color reflecting the reflected light of the fibers.

EXAMPLE 11

Five grams of silicon carbide whiskers (average diameter 0.2 micrometer, average length 100 micrometers) was put in a treating vessel holding 1 liter of ethanol, and subjected to ultrasonic vibration to prepare a suspension.

Bundles of the heat-treated inorganic fibers obtained in Example 1 (each consisting of 600 fibers) were unwound from a bobbin, dipped in the suspension while adjusting the dipping time to about 15 seconds by a movable roll, then pressed by press rolls, wound up on the bobbin, and dried in the atmosphere at room temperature. The resulting reinforcing inorgnic fibers [A] contained the whiskers interposed among the fibers and also among the fiber bundles. The amount of the whiskers adhering to the fibers was 0.03 g per 10 m of inorganic fiber bundle.

EXAMPLE 12

The heat-treated continuous inorganic fibers obtained in Example 2 were treated with a suspension of silicon carbide whiskers as in Example 11 to give reinforcing fibers [B] containing the whiskers interposed among the fibers and also among the fiber bundles. The amount of the whiskers adhering to the fibers was 0.03 g per 10 m of inorganic fiber bundle.

EXAMPLE 13

The heat-treated continuous inorganic fibers obtained in Example 3 were treated with a suspension of silicon carbide whiskers as in Example 11 to give reinforcing fibers [C] containing the whiskers interposed among the fibers and also among the fiber bundles. The amount of the whiskers adhering to the fibers was 0.03 g per 10 m of inorganic fiber bundle.

EXAMPLE 14

Example 11 was repeated except that a suspension containing 50 g of silicon carbide particles having an average particle diameter of 0.28 micrometer was used instead of the silicon carbide whiskers. Reinforcing fibers [D] were obtained in which the silicon carbide particles were interposed among the fibers and also among the fiber bundles. The amount of the silicon carbide adhering to the fibers was 0.03 g per 10 m of inorganic fiber bundle.

EXAMPLE 15

A bundle of the reinforcing fibers [A] (800 fibers) was cut to a length of 150 mm, and 50 cut fibers were bundled and inserted into a steel pipe. The pipe was preheated to 760° C. in a nitrogen gas atmosphere, and then placed in a casting mold. Molten pure aluminum at 760° C. was poured into the mold, and the entire mass in the mold was pressed under 500 kg/cm$^2$ for 60 seconds by using a punch. A fiber-reinforced aluminum composite material was obtained.

A section of the composite material cut in a direction at right angles to the axis of the continuous fibers was observed under a scanning electron micrograph. It was found that a number of the silicon carbide whiskers were present in the interstices among the continuous fibers and uniformly dispersed in the matrix metal, and the inorganic fibers are dispersed in the composite material without contacting one another.

The surface of the composite material showed a beautiful color by the harmony of the reflected light of brilliant blue emitted from the reinforcing fibers and the natural metallic luster of the matrix metal.

EXAMPLE 16

The reinforcing fibers [B] were aligned mono-axially, and impregnated with a commercial bisphenol A-type epoxy resin. The resin was pre-cured to form prepregs having a thickness of 0.15 mm. The prepregs were laminated and hot-pressed at 170° C. and 7 kg/cm$^2$ for 4 hours to obtain a composite having a thickness of 2 mm.

Observation of a cut section of the composite material under a scanning electron microscope showed that the silicon carbide whiskers adhered partly to the interfaces of the inorganic fibers and was also dispersed uniformly in the matrix resin, and the inorganic fibers were dispersed in the composite material without contacting one another. The composite material contained 55% by volume of the fibers and had a tensile strength of 15 kg/mm$^2$ and a short beam shear strength of 15 kg/mm$^2$.

The surface of the composite material showed a beautiful green color reflecting the reflected light of the reinforcing fibers.

EXAMPLE 17

Chopped fibers (45% by volume) obtained by cutting the reinforcing fibers [C] to a length of 10 mm were added to a bososilicate glass (7740) having an average particle diameter of 44 micrometers (produced by Corning Glass Co.). The mixture was well dispersed in isopropanol. The resulting slurry and the reinforcing fibers [C] uniformly aligned in one direction were alternately stacked, and the resulting stacked assembly was dried and treated by a hot press in an argon atmosphere at 1,300° C. under 750 kg/cm$^2$ for about 10 minutes to obtain an inorganic fiber-reinforced composite material.

Observation of a section of this composite material under a scanning electron microscope showed that the reinforcing fibers were dispersed without contacting one another in the matrix borosilicate glass.

The composite material had a flexural strength at room temperature of 20.5 kg/mm$^2$, amd the surface of the composite showed a beautiful bluish violet reflecting the reflected light of the fibers.

What is claimed is:

1. A reinforcing inorganic fiber having chromatic colors and being composed of an internal layer and a surface layer, wherein said internal layer is composed of an inorganic material containing 30 to 60% by weight of silicon, 0.5 to 35% by weight, of Titanium or Zirconium, 25 to 40% by weight of Carbon, and 0.01 to 30% by weight of Oxygen which is
    (i) an amorphous material consisting substantially of Si, M, C and O, or
    (ii) an aggregate consisting substantially of ultrafine crystalline particles with a particle diameter of not more than 500 A of B-Sic, MC, a solid solution of B-Sic and MC and MC$_{1-x}$, wherein M represents titanium or zirconium, and x is a number represented by $0 < x < 1$, or
    (iii) a mixture of the amorphous material (i) and the aggregate (ii), and said surface layer is of a thickness from 0.01 to 5 micrometers and is composed of an inorganic material consisting of 20 to 65% by weight of silicon 30 to 55% by weight of Oxygen, 0.3 to 40% by weight of Titanium or Zirconium, and 1 to 5% by weight of carbon which is (iv) an amorphous material consisting substantially of Si, M and O,
(v) an aggregate composed of crystalline $SiO_2$ and $MO_2$, or (vi) a mixture of the amorphous material (iv) and aggregate (v).

2. The reinforcing inorganic fibers of claim 1 wherein a ceramic in the form of a short fiber, whiskers or powder is adhered to the inorganic fibers.

3. The reinforcing inorganic fibers of claim 2 wherein the amount of the ceramic is 1 to 80% by volume based on the inorganic fibers.

4. The reinforcing inorganic fibers of claim 2 wherein the ceramic is selected from the group consisting of silicon carbide, titanium carbide, zirconium carbide, niobium carbide, tantalum carbide, boron carbide, chromium carbide, tungsten carbide, molybdenum carbide, silicon nitride, titanium nitride, zirconium nitride, vanadium nitride, niobium nitride, tantalum nitride, boron nitride, aluminum nitride, hafnium nitride, alumina, silica, magnesia, mullite, cordierite, borosilicate glass and lithium silicate.

5. The reinforcing inorganic fibers of claim 1 wherein the amount of silicon in the internal layer is 1–10% by weight.

6. The reinforcing inorganic fibers of claim 1 wherein the amount of Titanium or Zirconium in the surface layer is 1–15% by weight.

7. The reinforcing inorganic fibers of claim 1 wherein M is Titanium.

8. The reinforcing inorganic fibers of claim 1 wherein the chromatic colors are selected from one of the group consisting of blue, green, orange, brown, red, violet.

9. The reinforcing inorganic fibers of claim 1 wherein one or more ceramics in the form of a short fiber, whiskers or powder is adhered to the inorganic fiber.

* * * * *